US011767100B2

(12) United States Patent
Bishop et al.

(10) Patent No.: US 11,767,100 B2
(45) Date of Patent: Sep. 26, 2023

(54) AIRCRAFT SPOILER AND ACTUATION APPARATUS

(71) Applicant: AIRBUS OPERATIONS LIMITED, Bristol (GB)

(72) Inventors: Benjamin Bishop, Bristol (GB); Anthony Bryant, Bristol (GB)

(73) Assignee: AIRBUS OPERATIONS LIMITED, Bristol (GB)

(*) Notice: Subject to any disclaimer, the term of this patent is extended or adjusted under 35 U.S.C. 154(b) by 0 days.

(21) Appl. No.: 17/449,144

(22) Filed: Sep. 28, 2021

(65) Prior Publication Data

US 2022/0144411 A1    May 12, 2022

(30) Foreign Application Priority Data

Nov. 9, 2020 (GB) ...................... 2017624

(51) Int. Cl.
*B64C 13/30* (2006.01)
*B64C 9/26* (2006.01)
*B64C 13/34* (2006.01)
*B64C 9/32* (2006.01)

(52) U.S. Cl.
CPC .............. *B64C 13/30* (2013.01); *B64C 9/26* (2013.01); *B64C 9/323* (2013.01); *B64C 13/34* (2013.01)

(58) Field of Classification Search
CPC .. B64C 9/02; B64C 9/32; B64C 9/323; B64C 13/28; B64C 13/30
See application file for complete search history.

(56) References Cited

U.S. PATENT DOCUMENTS

| 2,460,843 | A | | 2/1949 | Ours | |
|---|---|---|---|---|---|
| 3,169,178 | A | * | 2/1965 | Notchev | B64C 9/02 200/61.46 |
| 4,032,087 | A | | 6/1977 | Cleaves | |
| 2012/0193183 | A1 | * | 8/2012 | Gunter | B64C 9/323 192/30 R |

(Continued)

FOREIGN PATENT DOCUMENTS

| DE | 733 504 | 3/1943 |
|---|---|---|
| DE | 10 2015 012237 | 3/2017 |

(Continued)

OTHER PUBLICATIONS

Paul Lancelot and Roeland De Breuker, "Passively actuated spoiler for gust load alleviation", *ResearchGate*, Conference Paper—ICAST2016: 27th International Conference on Adaptive Structures and Technologies, Oct. 3-5, 2016, 10 pages.

(Continued)

*Primary Examiner* — Timothy D Collins
*Assistant Examiner* — Brendan Kroger Schneider
(74) *Attorney, Agent, or Firm* — Nixon & Vanderhye P.C.

(57) ABSTRACT

An aircraft wing with a wing structure and a spoiler movable between a stowed configuration and a deployed configuration are disclosed. The spoiler includes an actuator configurable between an engaged mode and a disengaged mode. When the actuator is in the engaged mode, the actuator can restrict movement of the spoiler and move the spoiler between the stowed configuration and deployed configuration. In the disengaged mode, the actuator allows free movement of the spoiler, such that the spoiler may pop up due to reduced air pressure on the aircraft wing.

12 Claims, 9 Drawing Sheets

(56) References Cited

U.S. PATENT DOCUMENTS

2012/0234983 A1* 9/2012 Wildman ................. B64C 9/14
244/99.2
2020/0070958 A1 3/2020 Decker

FOREIGN PATENT DOCUMENTS

FR 3 041 398 3/2017
WO 2011/070347 6/2011

OTHER PUBLICATIONS

United Kingdom Search Report for Application No. GB2017624.4, dated Apr. 27, 2021, one page.
Extended European Search Report for Application No. EP 21192901.3, seven pages, dated Feb. 8, 2022.

* cited by examiner

AIRCRAFT SPOILER AND ACTUATION APPARATUS

CROSS RELATED APPLICATION This application claims priority to United Kingdom Patent Application GB 2017624.4, filed Nov. 9, 2020, the entire content of which is hereby incorporated by reference.

BACKGROUND OF THE INVENTION

The present disclosure relates to aircraft with moveable spoilers.

Aircraft may be equipped with moveable spoilers attached to wing structures. The spoilers may be used to provide load-alleviation during flight, for example, in the event of wind gusts. Typically, the spoiler can move from a stowed configuration to a deployed, or load-alleviating, configuration in which the load on the wing is reduced. Once the cause of the requirement to enter the load-alleviating configuration has passed, it is often desirable to move the spoiler back into the stowed configuration.

Some aircraft may be able to detect approaching gusts, and to deploy a spoiler accordingly. However, the speed of deployment of the spoiler is a consideration on many aircraft. For example, many commercial airliners cruise at around Mach 0.8. Consequently, the aircraft may encounter a gust a very short time (e.g. a fraction of a second) after detecting it. To provide load-alleviation from such gusts, it is therefore desirable to deploy the spoiler as quickly as possible.

An actuator, for example an electro-mechanical actuator, may be used to move the spoiler between different configurations, for example between a stowed configuration and a deployed configuration. The actuator may move the spoiler in response to the detection of an oncoming gust. However, such an actuator may require a substantial load and/or power capacity, particularly in order to deploy the spoiler quickly enough to provide adequate load-alleviation. Typically, the larger the load and/or power capacity required by the actuator, the larger and heavier the actuator. The inclusion of a large, heavy (and potentially complex) actuator system on the aircraft may lessen or erode some or all of the aerodynamic benefits brought about by the moveable spoiler itself. Further, on-board space is an important consideration on aircraft.

The present invention seeks to mitigate one or more of the above-mentioned problems. Alternatively or additionally, the present invention seeks to provide an improved aircraft and aircraft wing

SUMMARY OF THE INVENTION

The present invention provides, according to a first aspect, an aircraft wing comprising a wing structure and a spoiler movable relative to the wing structure between a stowed configuration and a deployed configuration, wherein the spoiler comprises a hinged top flap movable between a first position and a second position, wherein in the first position the hinged top flap is constrained by an actuator, and in the second position the hinged top flap is unconstrained by the actuator, wherein when the spoiler is in the stowed configuration the hinged top flap is in the first position, and when the spoiler is in the deployed position the hinged top flap is in the second position.

In the stowed configuration, the upper surface of the hinged top flap may be a continuation of the upper surface of the wing structure. There may be a smooth transition from the wing structure to the spoiler. The actuator may be arranged to control movement of the hinged top flap between the first position and the second position. The actuator may be arranged to secure the hinged top flap in the first position when the spoiler is in the stowed configuration. The actuator may be arranged to allow movement of the hinged top flap into the second position prior to movement of the spoiler into the deployed position.

In the deployed configuration, the spoiler may be moved relative to the wing structure such that the load on the wing is reduced. In some cases, the upper surface of the spoiler is moved away from the upper surface of the wing structure in the deployed configuration. The spoiler may be movable, from the stowed configuration to the deployed configuration, in an upwards direction. The spoiler may be movable, from the deployed configuration to the stowed configuration, in a downwards direction. The upwards and downwards directions will be understood by the skilled person be references made to the usual orientation of the aircraft wing in use.

Movement of the hinged top flap into the second position may result from negative pressure at the upper surface of the aircraft wing. During flight, a negative pressure exists on the upper surface of the wing. This negative pressure causes an upward lifting force which urges the hinged top flap into the second position. When in the stowed configuration, the actuator resists the upward lifting force on the hinged top flap and the hinged top flap remains in position. Once the actuator ceases to constrain movement of the hinged top flap, the upward lifting force moves the top flap into the second position. When in the second position, the hinged top flap may be arranged such that the hinged top flap interrupts the airflow over the aircraft wing. The spoiler may be arranged to extend away from the stowed configuration into the deployed configuration under the negative air pressure acting on the hinged top flap. The spoiler may comprise a linear guide mechanism, for example one or more linear ball tracks, to constrain the movement of the spoiler. The linear guide mechanism may be arranged to constrain the movement of the spoiler to a direction approximately perpendicular to the top surface of the aircraft wing. Alternatively or additionally, the linear guide mechanism may be oriented to guide the movement of the spoiler in any direction as determined to be desirable by a skilled person. Constraining the spoiler to move in a linear path between the stowed and deployed positions may advantageously make housing the spoiler in the stowed position more straightforward. For example, if a non-linear deployment path is followed, the housing may require the spoiler to include cut-outs to prevent fouling during movement. A linear path between the stowed position and deployed position avoids the need for the increased structural complexity. The linear path may also make it more straightforward to form a good seal with the surrounding top surface of the aircraft wing. The upward lifting force on the spoiler may be substantial. For example, the upward lifting force may be of the order of 900 Newtons applied over the area of the spoiler. The spoiler exploits this aerodynamic force, namely allowing deployment to take place under the action of the aerodynamic force. As such, the spoiler may be able to deploy more quickly during flight compared to known mechanisms. The spoiler actuation apparatus may allow the spoiler to be deployable in less than a second. In some cases, the spoiler can deploy in less than 0.2 seconds. The spoiler is deployable in approximately 0.1 seconds in some examples. The spoiler may therefore be considered to be a "pop-up" spoiler.

By using aerodynamic forces to aid deployment of the spoiler, the size and/or weight of the actuator may be reduced. In particular, as the actuator is only required to retract the spoiler, rather than power the rapid deployment of the spoiler, a smaller and/or less powerful actuator may be used. The need to retract the spoiler at speed may be less than the need to deploy the spoiler at speed, and the invention may take advantage of this asymmetry such that a smaller and/or less powerful actuator is used.

By reducing the spoiler deployment time, the spoiler can react to temporal aerodynamic events, such as gusts, more effectively. For example, an oncoming gust may be detected (e.g. using light detection and ranging (LIDAR), or other gust detection techniques), and in response the spoiler may be deployed quickly, to reduce and alleviate gust loads. Alleviating gust loads can reduce structural deformations of the wing (e.g. due to wing bending moments). This can allow for a lighter airframe to be used. Additionally or alternatively, this may enable the wing to have a relatively large span, without necessarily having to incur the associated weight penalty, because it can be designed for a lower magnitude of maximum load. Further, alleviating gust loads can improve dynamic flight performance and/or comfort for passengers.

The spoiler may be arranged such that as part of the movement from the deployed position to the stowed position, the hinged top flap is moved into the first position prior to any retraction of the spoiler. The movement of the hinged top flap into the first position may open an air gap in the spoiler. The air gap may reduce the actuation force required to move the spoiler from the deployed configuration to the retracted configuration. The spoiler may be arranged such that when the hinged top flap is in the second position, an air dam closes the air gap which exists when the hinged top flap is in the first position.

The actuator may be arranged to move the spoiler from the deployed configuration to the stowed configuration. The actuator may comprise a clutch arrangement which allows free movement in one direction when the spoiler is being moved into the deployed configuration. The clutch arrangement may be configured to engage a drive mechanism to allow the spoiler to be retracted into the stowed configuration. The clutch mechanism may be arranged to be lockable to prevent movement of the hinged top flap between the first position and second position. The clutch mechanism may comprise a dog clutch. The dog clutch may comprise a ramped dog clutch, such that rotary movement of one part of the dog clutch relative to another part of the dog clutch increases or decreases the overall width of the dog clutch. The clutch mechanism may comprise a spring, for example a wave or helical spring. The clutch mechanism may comprise series of friction clutch plates. The clutch mechanism may comprise each of a ramped dog clutch, a spring, and a series of friction clutch plates. The spring may be sandwiched between the ramped dog clutch and the series of friction clutch plates. Such an arrangement may be configured such that rotary movement of the dog clutch in a first direction increases the width of the dog clutch, thereby compressing the spring, and increasing the friction between the friction clutch plates to as to engage the friction clutch plates. Rotary movement of the dog clutch in a second direction may decrease the overall width of the dog clutch, thereby reducing compression of the spring, and consequently reducing the friction between the friction clutch plates so as to allow the friction clutch plates to move relative to each other. The actuator may comprise a cable and cable drum. The cable may be attached at one end to the hinged top flap and at the other end of the cable drum. The cable may be held under tension when the spoiler is in the stowed position, to as to secure the hinged top flap in the first position. The tension in the cable may be released to allow the hinged top flap to move into the second position, and to allow the spoiler to move into the deployed position unencumbered. In order to retract the spoiler, the cable may be tensioned to first pull the hinged top flap into the first position. This may open an air gap in the spoiler, thus reducing the actuation force required to retract the spoiler. The cable may be reeled around the cable drum in order to retract the spoiler into the stowed position. Once in the stowed position, the cable may continue to be held under tension so secure the hinged top flap in the first position. The cable drum may be mechanically connected to some of the series of friction clutch plates. The clutch mechanism may be operated to allow free movement of the cable drum, for example to allow the cable to be unspooled from the cable drum when the spoiler moves into the deployed position. The clutch mechanism may be operated to engage with the cable drum and provide rotary motive force to the cable drum, for example to drive the cable drum to rotate and spool the cable around the cable drum when moving the spoiler into the stowed position. The actuator may arranged to allow redeployment of the spoiler part way through the retraction processes. The redeployment of the spoiler part way through the retraction process may essentially match the deployment of the spoiler from the stowed to deployed configuration, other than starting from a different initial position to the stowed position.

The aircraft wing may comprise a plurality of spoilers described as above. The plurality of spoilers may be associated with a common drive mechanism, such that deployment and retraction of the plurality of spoilers occurs simultaneously. Alternatively, the plurality of spoilers may each be associated with an individual drive mechanism. In such an arrangement, if one individual drive mechanism fails, the remaining spoilers may still be operated. Also, provision of individual drive mechanisms may allow for individual control of the spoilers, which may be preferable depending on the flying conditions. For example, smaller gusts may require deployment of only some of the plurality of spoilers, with larger gust requiring deployment of all of the plurality of spoilers.

The wing structure may comprise a folding wing tip. In other cases, the wing structure comprises a fixed-wing structure.

According to a second aspect, the invention provides a method of deploying a stowed spoiler in an aircraft wing, the aircraft wing according to the first aspect of the invention, the method comprising the steps of: disengaging the actuator such that the hinged top flap is unconstrained, thereby allowing negative air-pressure to move the hinged top flap into the second position, the negative air-pressure acting on the spoiler such that the spoiler moves into the deployed position.

The actuator may comprise a clutch mechanism, wherein the clutch mechanism is operable between an engaged mode in which the hinged top flap is constrained by the actuator, and a disengaged mode in which the hinged top flap is unconstrained by the actuator, and the method comprises the step of moving the clutch mechanism from the engaged mode to the disengaged mode.

A method of retracting a deployed spoiler in an aircraft wing, the aircraft wing according to the first aspect of the invention, the method comprising the steps of: engaging the actuator such that the hinged top flap is constrained by the actuator and moved into the first position.

The actuator may comprise a clutch mechanism, wherein the clutch mechanism is operable between an engaged mode in which the hinged top flap is constrained by the actuator, and a disengaged mode in which the hinged top flap is unconstrained by the actuator, and the method comprises the step of moving the clutch mechanism from the disengaged mode to the engaged mode.

According to a fourth aspect, the invention provides an aircraft wing comprising a wing structure and a spoiler movable relative to the wing structure between a stowed configuration and a deployed configuration, wherein the spoiler comprises an actuator configurable between an engaged mode and a disengaged mode, wherein in the engaged mode, the actuator is arranged to restrict movement of the spoiler and/or move the spoiler between the stowed configuration and deployed configuration, and in the disengaged mode, the actuator allows free movement of the spoiler.

The actuator may be arranged to move the spoiler from the deployed configuration to the stowed configuration. The actuator may comprise a clutch arrangement which, when the actuator is in the disengaged mode, allows free movement in one direction when the spoiler is being moved into the deployed configuration. The movement of the spoiler into the deployed configuration may be as a result of negative air pressure on the top outer surface of the wing structure.

When the actuator is in the engaged mode, the clutch arrangement may be configured to engage a drive mechanism to allow the spoiler to be retracted into the stowed configuration. When the actuator is in the engaged mode, the clutch mechanism may be arranged to be lockable to prevent movement of spoiler. The clutch mechanism may comprise a dog clutch. The dog clutch may comprise a ramped dog clutch, such that rotary movement of one part of the dog clutch relative to another part of the dog clutch increases or decreases the overall width of the dog clutch. The clutch mechanism may comprise a spring, for example a wave or helical spring. The clutch mechanism may comprise series of friction clutch plates. The clutch mechanism may comprise each of a ramped dog clutch, a spring, and a series of friction clutch plates. The spring may be sandwiched between the ramped dog clutch and the series of friction clutch plates. Such an arrangement may be configured such that rotary movement of the dog clutch in a first direction increases the width of the dog clutch, thereby compressing the spring, and increasing the friction between the friction clutch plates to as to engage the friction clutch plates. Rotary movement of the dog clutch in a second direction may decrease the overall width of the dog clutch, thereby reducing compression of the spring, and consequently reducing the friction between the friction clutch plates so as to allow the friction clutch plates to move relative to each other. The actuator may comprise a cable and cable drum. The cable may be attached at one end to spoiler and at the other end to the cable drum. The cable may be held under tension when the spoiler is in the stowed position, to as to secure the spoiler in the first position. The tension in the cable may be released to allow the spoiler to move into the deployed position unencumbered. The cable may be reeled around the cable drum in order to retract the spoiler into the stowed position. Once in the stowed position, the cable may continue to be held under tension to secure the spoiler in the first position. The cable drum may be mechanically connected to some of the series of friction clutch plates. The clutch mechanism may be operated to allow free movement of the cable drum in a first direction, for example to allow the cable to be unspooled from the cable drum when the spoiler moves into the deployed position. The clutch mechanism may be operated to engage with the cable drum and provide rotary motive force to the cable drum, for example to drive the cable drum to rotate in a second direction and spool the cable around the cable drum when moving the spoiler into the stowed position.

The actuator may arranged to allow redeployment of the spoiler part way through the retraction processes. The redeployment of the spoiler part way through the retraction process may essentially match the deployment of the spoiler from the stowed to deployed configuration, other than starting from a different initial position to the stowed position. The redeployment of the spoiler may comprise the actuator switching from the engaged mode to the disengaged mode, such that the actuator allows free movement of the spoiler.

According to a fifth aspect of the invention, there is provided a method of deploying a stowed spoiler in an aircraft wing according the fourth aspect of the invention, the method comprising the step of configuring the actuator in the disengaged mode, thereby allowing for free movement of the spoiler. As will be understood by the skilled person, and as described above, when the spoiler is allowed to move freely, the reduced air pressure at the top surface of a wing will pull the spoiler into the deployed position.

According to a sixth aspect of the invention, there is provided a method of retracting a deployed spoiler in an aircraft wing according to a fifth aspect of the invention, the method comprising the step of configuring the actuator in the engaged mode, and activating the actuator to retract the spoiler.

According to a seventh aspect of the invention, there is provided an aircraft wing an aircraft wing comprising a wing structure and a spoiler movable relative to the wing structure in a linear manner between a stowed configuration and a deployed configuration. The spoiler may comprise a linear guide mechanism, for example a linear ball track. The linear guide mechanism may comprise a telescopic linear ball track.

According to an eighth aspect of the invention, there is provided an actuator comprising a ramped dog clutch, a spring, a series of friction clutch plates, a cable drum, and a cable, the ramped dog clutch comprising a first part and a second part, the first part and the second part rotatable relative to one another such that in a first configuration the width of the ramped dog clutch is reduced relative to a second configuration, and the is spring located between the ramped dog clutch and the series of friction clutch plates such that when the ramped dog clutch is in the first configuration the friction clutch plates do not engage and when the ramped dog clutch is in the second configuration the friction clutch plates do engage, and the cable drum is keyed to at least one of the friction clutch plates. The skilled person will appreciated that where the friction plates are said not to engage, the friction plates may still be in contact, though not with enough friction between the plates that they are forced to move together. Where the friction plates are said to be engaged, they are in contact with each other such that they are forced to move together.

By moving the dog clutch between the first configuration and second configuration, the actuator allows for the connection or disconnection of the cable drum to a drive shaft. When the cable drum is connected to a drive shaft, rotation of the drive shaft will control the spooling or unspooling for the cable associated with the cable drum. When the cable drum is disconnected from the drive shaft, the cable and cable drum may move freely with respect to the drive shaft.

According to an ninth aspect of the invention, there is provided an aircraft, the aircraft comprising an aircraft wing according to any of the first, fourth, or seventh aspects of the invention.

According to a tenth aspect of the invention, there is provide an aircraft, the aircraft comprising an actuator according to the eighth aspect of the invention.

It will of course be appreciated that features described in relation to one aspect of the present invention may be incorporated into other aspects of the present invention. For example, the method of the invention may incorporate any of the features described with reference to the apparatus of the invention and vice versa, or the first aspect of the invention may incorporate any of the features described with reference to the second to tenth aspects of the invention and vice versa.

DESCRIPTION OF THE DRAWINGS

Embodiments of the present invention will now be described by way of example only with reference to the accompanying schematic drawings of which.

DETAILED DESCRIPTION

Figure 1:
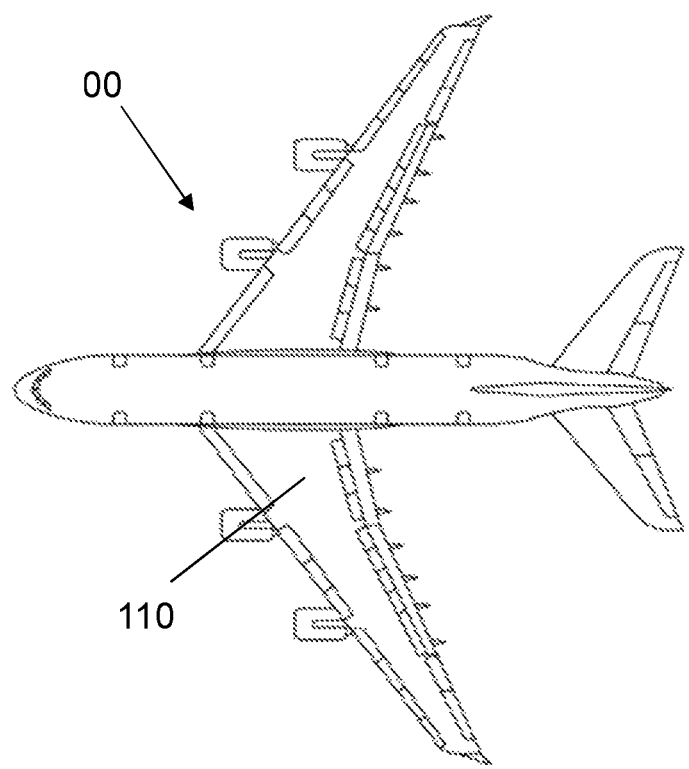
FIG. 1 shows a schematic view of an aircraft comprising an aircraft wing according to a an embodiment of the invention.
Figure 2:
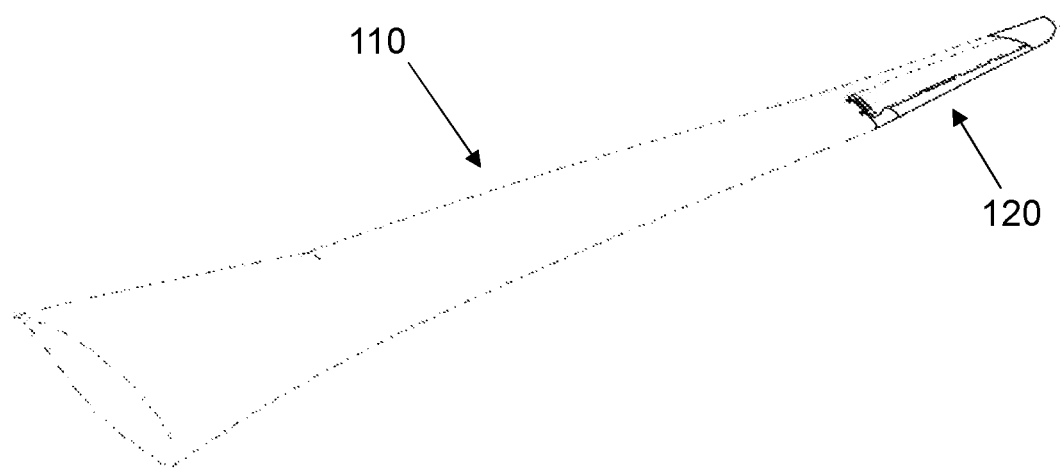
FIG. 2 shows a schematic view of the aircraft wing shown in FIG. 1.

FIG. 1 shows a plan view of an aircraft 100 according to a first embodiment. The aircraft 100 is a fixed-wing aircraft. The aircraft 100 comprises a wing 110. Whilst the wing 110 shown in FIG. 1A is a swept wing, the methods and apparatuses described herein may also be applied to unswept wings. The wing 110 is shown in isolation in FIG. 2. The wing 110 comprises a wing tip region 120.

Figure 3:
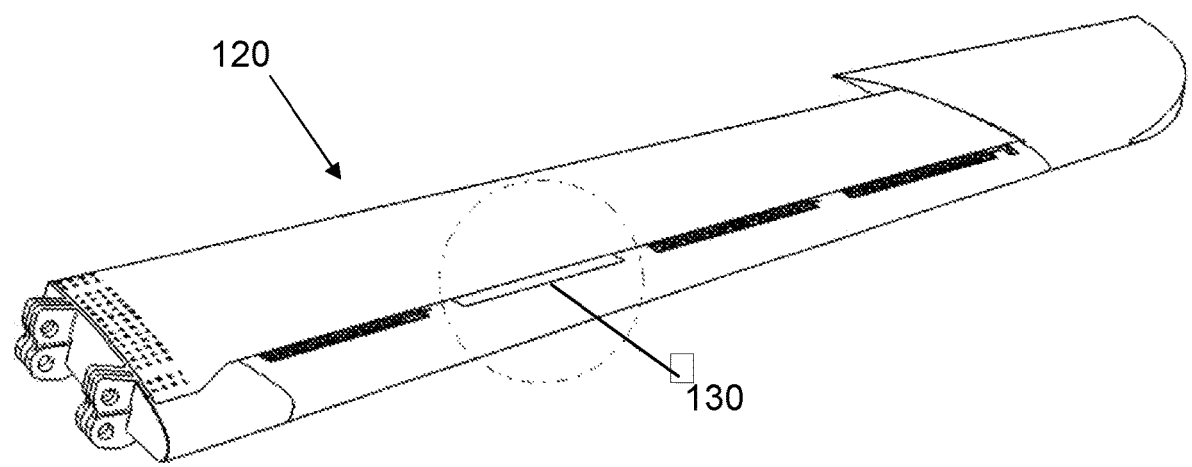
FIG. 3 shows an aircraft wing tip comprising a spoiler arrangement according to the invention.

FIG. 3 shows the wing tip region 120 of the wing 110 in more detail. The wing tip region 120 comprises a moveable spoiler 130. Whilst the spoiler 130 is located in the wing tip region 120 in the embodiment shown in FIG. 3, one or more spoilers may additionally or alternatively be located in other regions of the wing 110 in alternative embodiments. The one or more additional spoilers may be arranged to be deployed simultaneously with the spoiler 130, or alternatively arranged for individual deployment as will be described further below. Whilst the spoiler 130 is located in the vicinity of the wing leading edge in this embodiment, one or more spoilers may be located elsewhere (e.g. at the trailing edge) in alternative embodiments.

Figure 4:
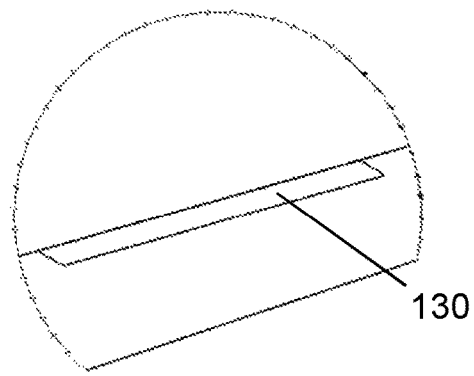
FIG. 4 shows a spoiler from the spoiler arrangement of FIG. 3 in the stowed position.
Figure 5:
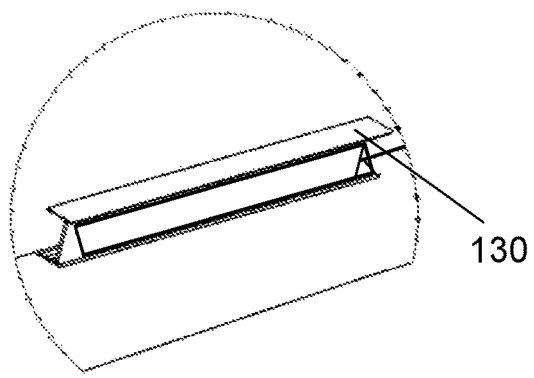
FIG. 5 shows a spoiler from the spoiler arrangement of FIG. 4 in the deployed position.

FIG. 4 shows the spoiler 130 in the stowed configuration, where a smooth and uninterrupted surface is provided in the region of the spoiler 130 and the wing tip 120. FIG. 5 shows the spoiler 130 in the deployed position, where the spoiler has been extended out of the wing tip 120.

Figure 6:
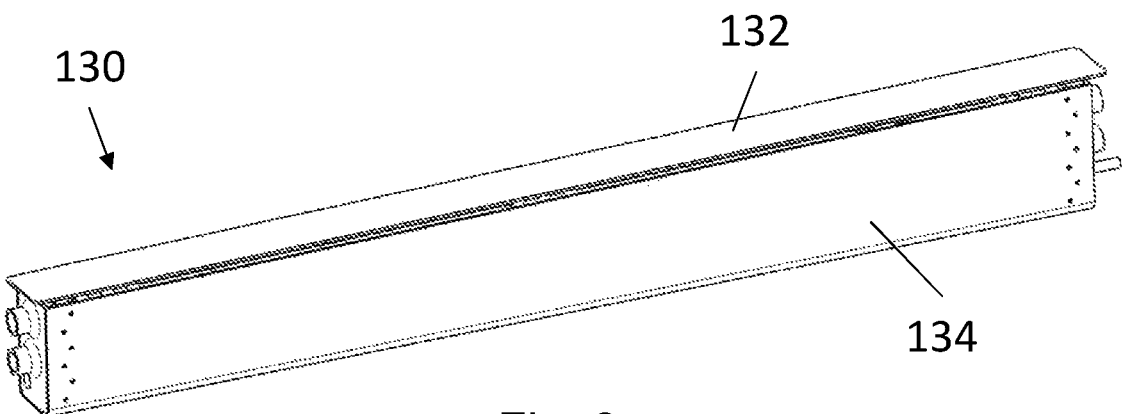
FIG. 6 shows a spoiler according to the invention.

FIG. 6 shows the spoiler 130 in isolation, in the stowed position. The spoiler 130 comprises a top flap 132 and a body section 134. In the stowed position, the top flap 132 sits flush with the outer surface of the wing tip 120, and the body section 134 is housed entirely within a cavity in the wing tip 120.

Figure 7:
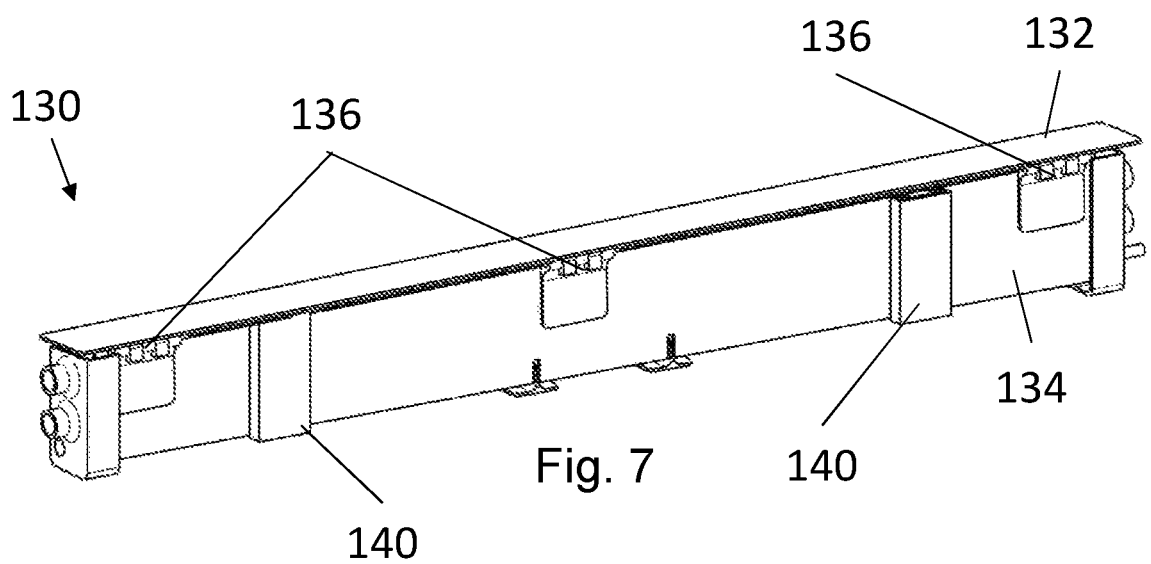
FIG. 7 shows the spoiler shown in FIG. 6 which some elements removed for clarity.

FIG. 7 shows the spoiler 130 as shown in FIG. 6, with an outer cover of the main body 134 removed. The top flap 132 is hinged to the main body 134 via three sets of hinges 136. The hinges 136 allow movement of the top flap 132 between a first position and second position as will be described further below. The spoiler 130 further includes two telescopic linear ball tracks 140.

Figure 8:
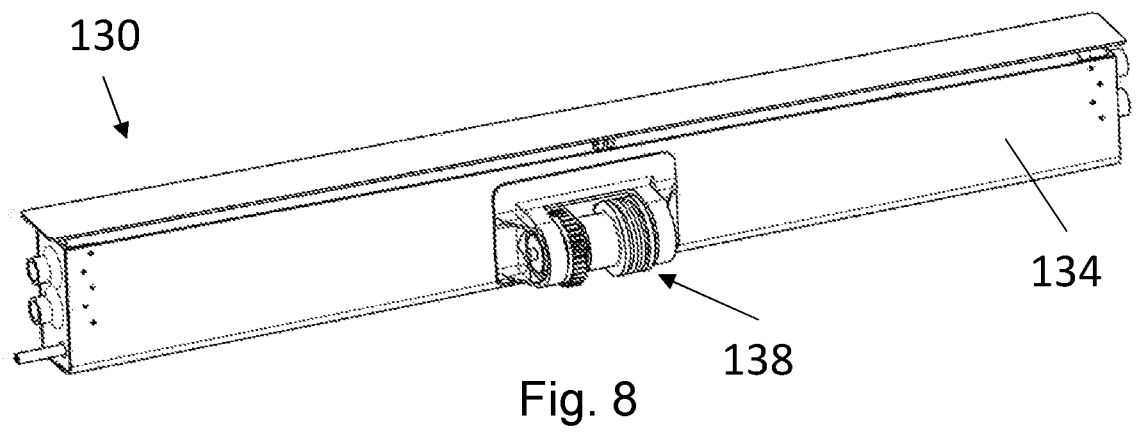
FIG. 8 shows the spoiler shown in FIG. 6 with a rotary actuator.

FIG. 8 shows the spoiler 130 as shown in FIG. 6, with the addition of a rotary actuator 138. The rotary actuator 138 sits within the body of the wing tip 120 and is configured to secure the top flap 132 in the first position, allow movement of the top flap 132 into the second position, allow movement of the spoiler 130 into the deployed position, and retract the spoiler 130 into the stowed position, as will be described further below.

Figure 9:
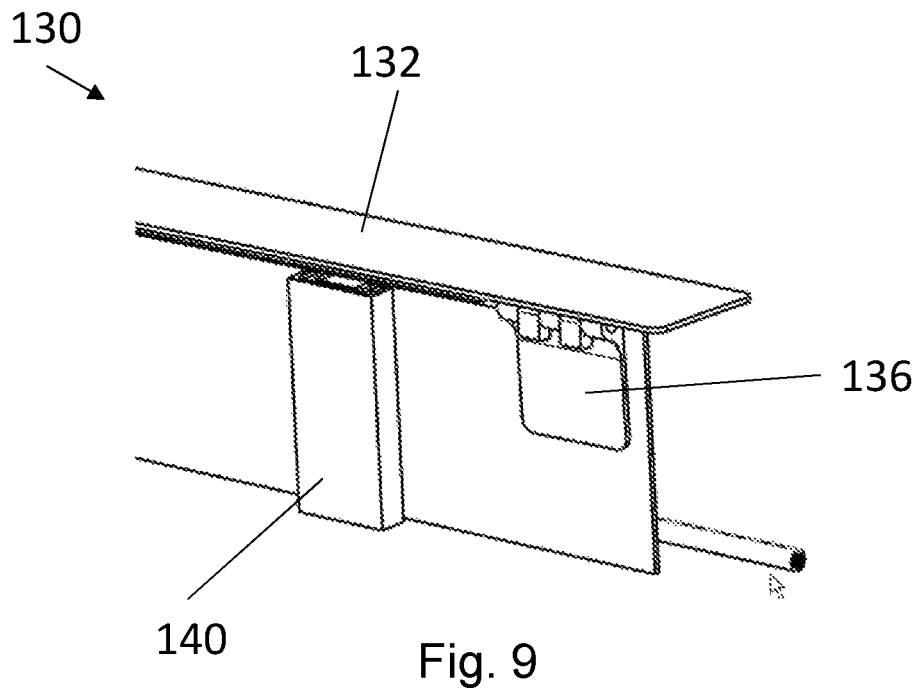
FIG. 9 shows a partial view of a spoiler in the stowed position.

FIG. 9 shows a close up view of the spoiler 130 as shown in FIG. 6. The spoiler 130 shows the linear ball track 140 in the retracted position as the spoiler 130 is in the stowed position. The base of the linear ball track 140 is fixed relative to the cavity in the wing tip 120 in which the spoiler 130 is housed.

Figure 10:
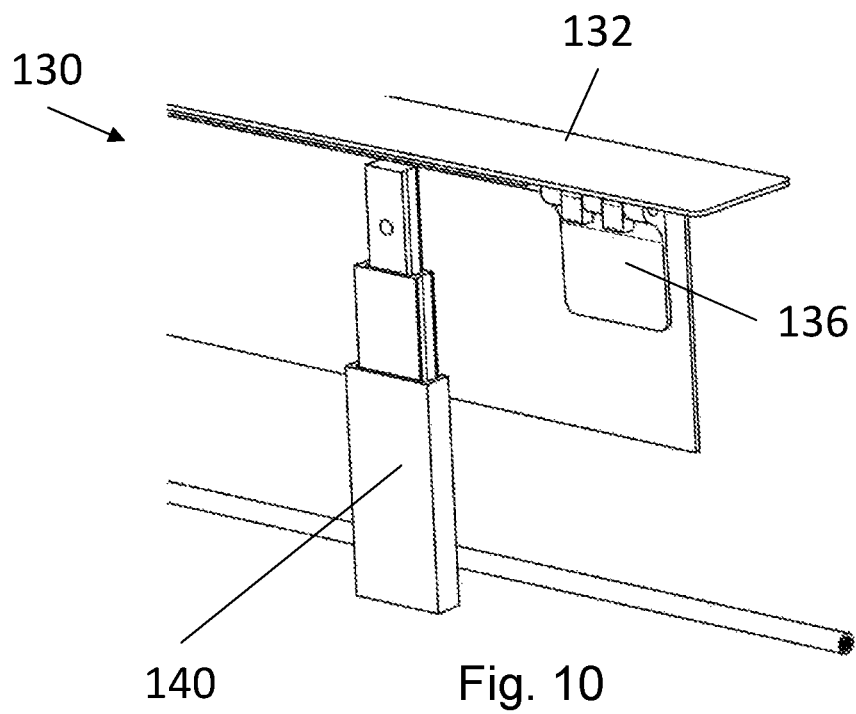
FIG. 10 shows a partial view of the spoiler of FIG. 9 in a deployed position.

FIG. 10 shows the arrangement described with reference to FIG. 9, with the spoiler 130 in the deployed position. As can be seen, the linear ball track 140 is in an extended position. The linear ball track 140 ensures that the spoiler 130 moves in a linear manner between the stowed position and deployed position. The linear ball track 140 also includes a stop to restrict movement of the spoiler 130 such that extension beyond the deployed position is not possible.

Figure 11:
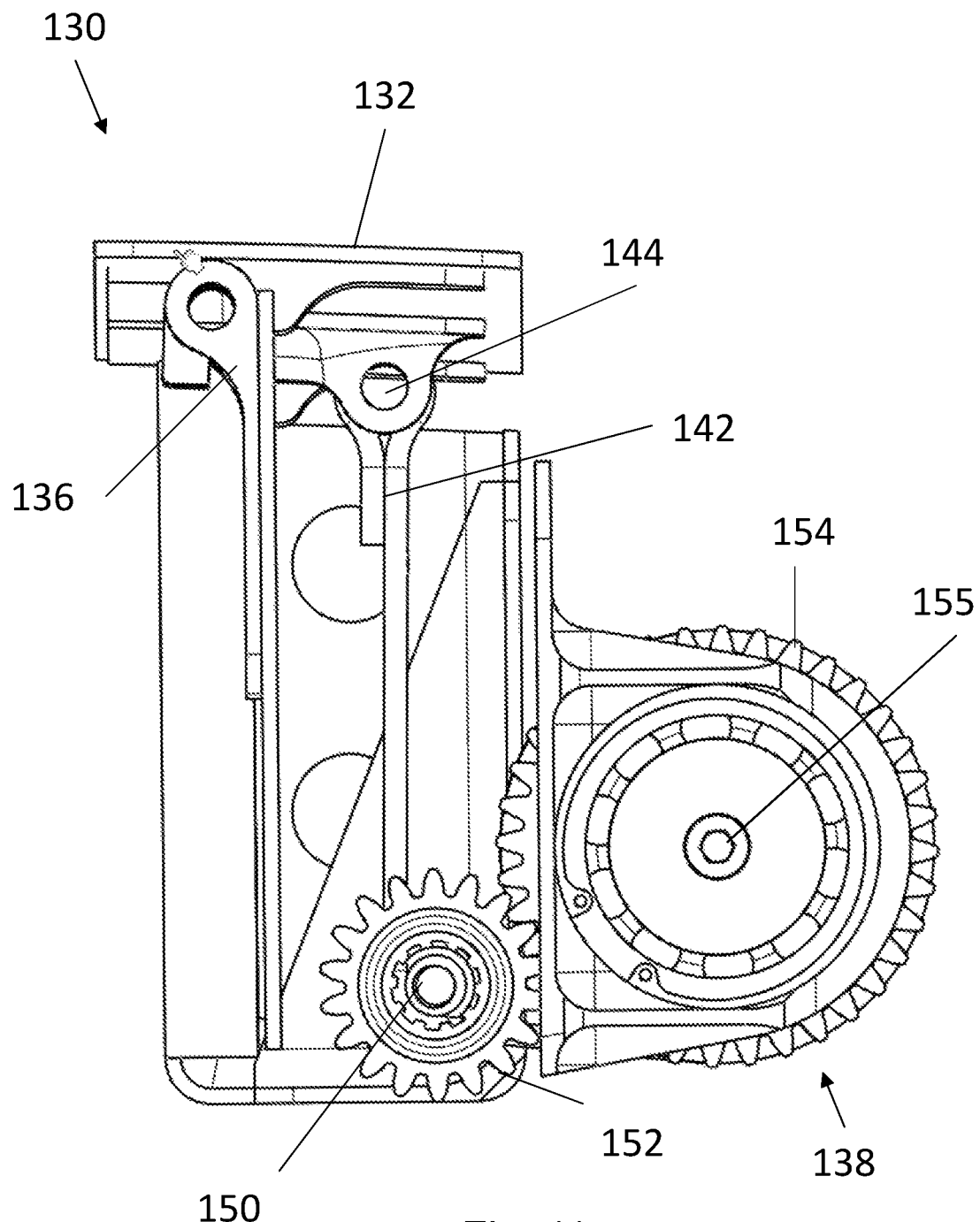
FIG. 11 shows a cross-sectional view of a spoiler in the stowed position.

FIG. 11 shows a cross sectional view of the spoiler 130 in a stowed position, along with the rotary actuator 138. The hinged top flap 132 of the spoiler is held in the first position by a cable 142 extending from the rotary actuator 138 and secured to a lug 144 on the base of the top flap 132.

Figure 12:
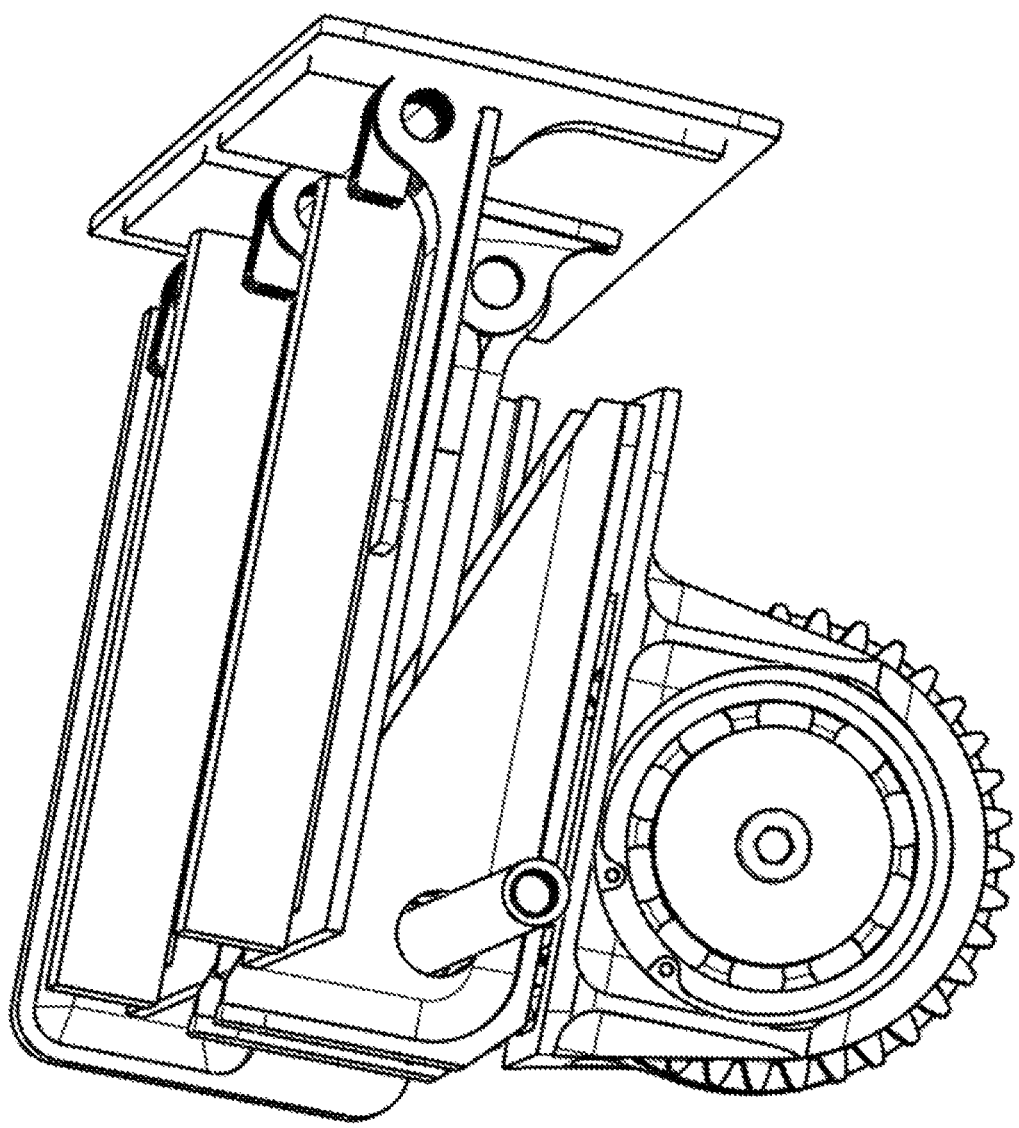
FIG. 12 shows an isometric view the spoiler of FIG. 11.

FIG. 12 shows an isometric view of the spoiler 130, with the spoiler still housed within the wing tip 120 as shown in FIG. 11. In order to move the top flap 132 into the second position, tension on the cable 142 is released, such that air pressure acting on the spoiler 130 moves the top flap 132 into the second position. In the second position, the top flap 132 has rotated around the hinge until the hinge 136 hits a stop which restricts any further rotary movement. When the top flap 132 is in the second position, the front edge of the top flap 132 no longer sits flush with the wing tip upper surface, and the airflow across the wing tip 120 will catch the exposed edge of the top flap 132 such that the spoiler rapidly moves into the deployed position. The deployment time is very rapid, potentially taking only 0.1 seconds, and other than the release of tension on the cable 142 requiring active actuation, as will be described further below, the actuation of the spoiler 130 between the stowed and deployed position is done passively via the airflow acting on the top flap 132.

Figure 13:
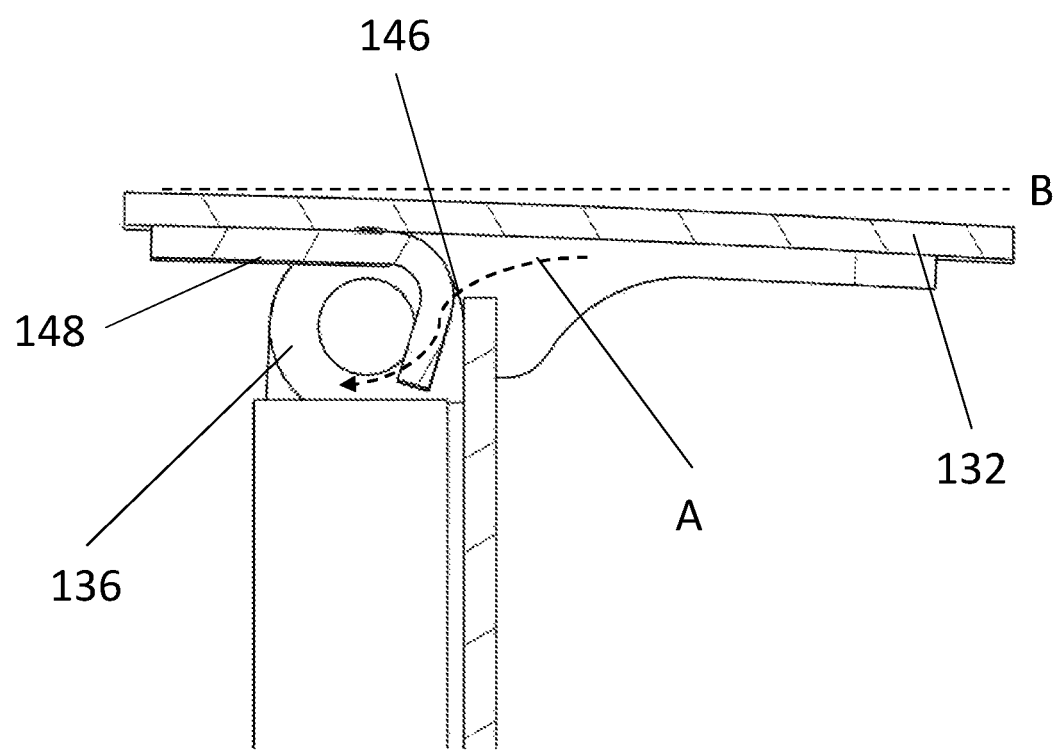
FIG. 13 shows the hinged top flap in the first position.

FIG. 13 shows the spoiler 130 in cross-section, focusing on the top flap 132. The top flap 132 is shown in the first position, where the cable 144 (not shown) is under tension and pulling the top flap 132 into the first position. As can be seen, when the top flap 132 is in the first position, an air gap is created at the hinge line 146. This allows the passage of air, as indicated by the arrow A, from the front to the back (as determined by the line of flight of the aircraft) of the spoiler 130. Providing this air gap and the resultant airflow reduces the force required to retract the spoiler 130 from the deployed to stowed position. The dashed line B shows the approximate position of the top flap 132 when the top flap 132 is in the second position. As can be seen, an air dam 148 rotates with the top flap 132 such that the air gap provided at the hinge line 146 is blocked, therefore ensuring the spoiler 130 takes the full force of air flowing into the spoiler 130. This will ensure the rapid movement of the spoiler 130 into the deployed position.

Figure 14:
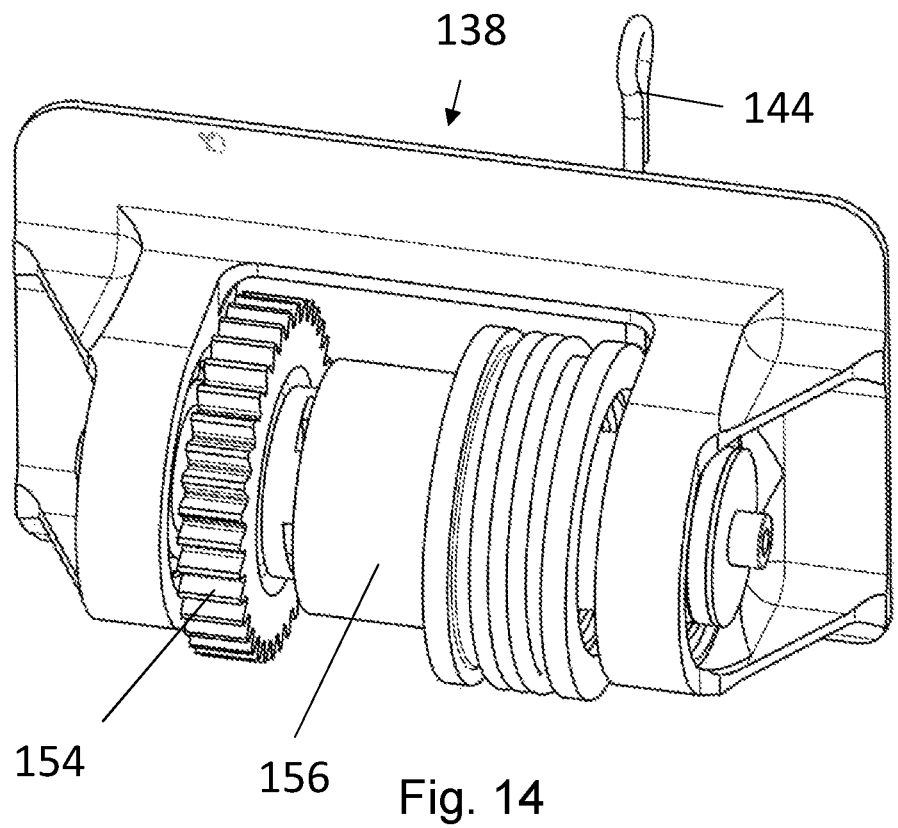
FIG. 14 shows a schematic view of a rotary actuator.
Figure 15:
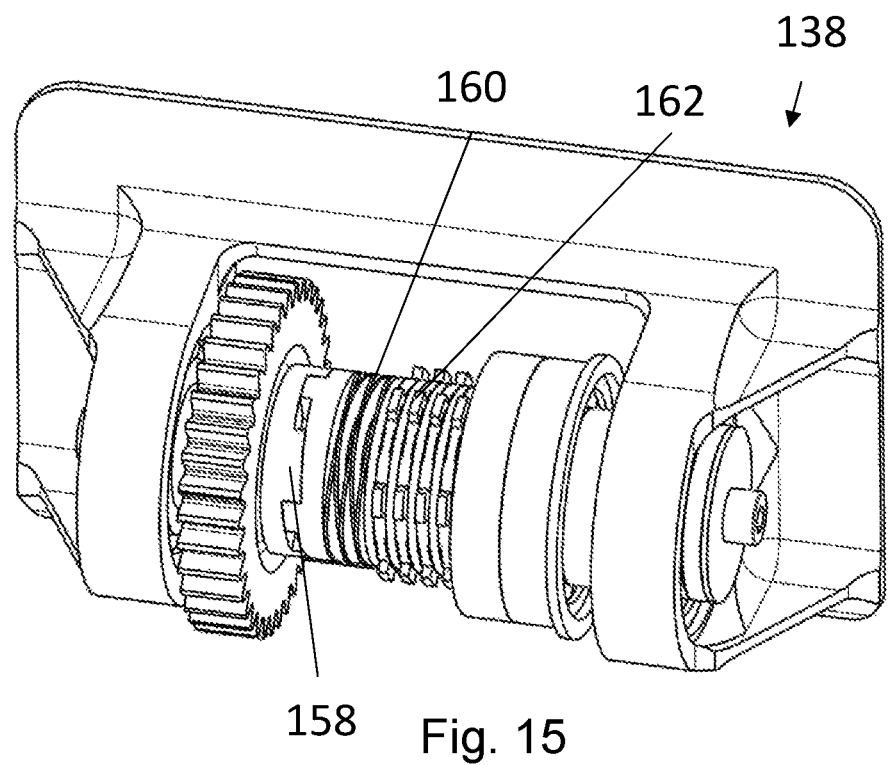
FIG. 15 shows the rotary actuator of FIG. 14 with some elements removed.
Figure 16:
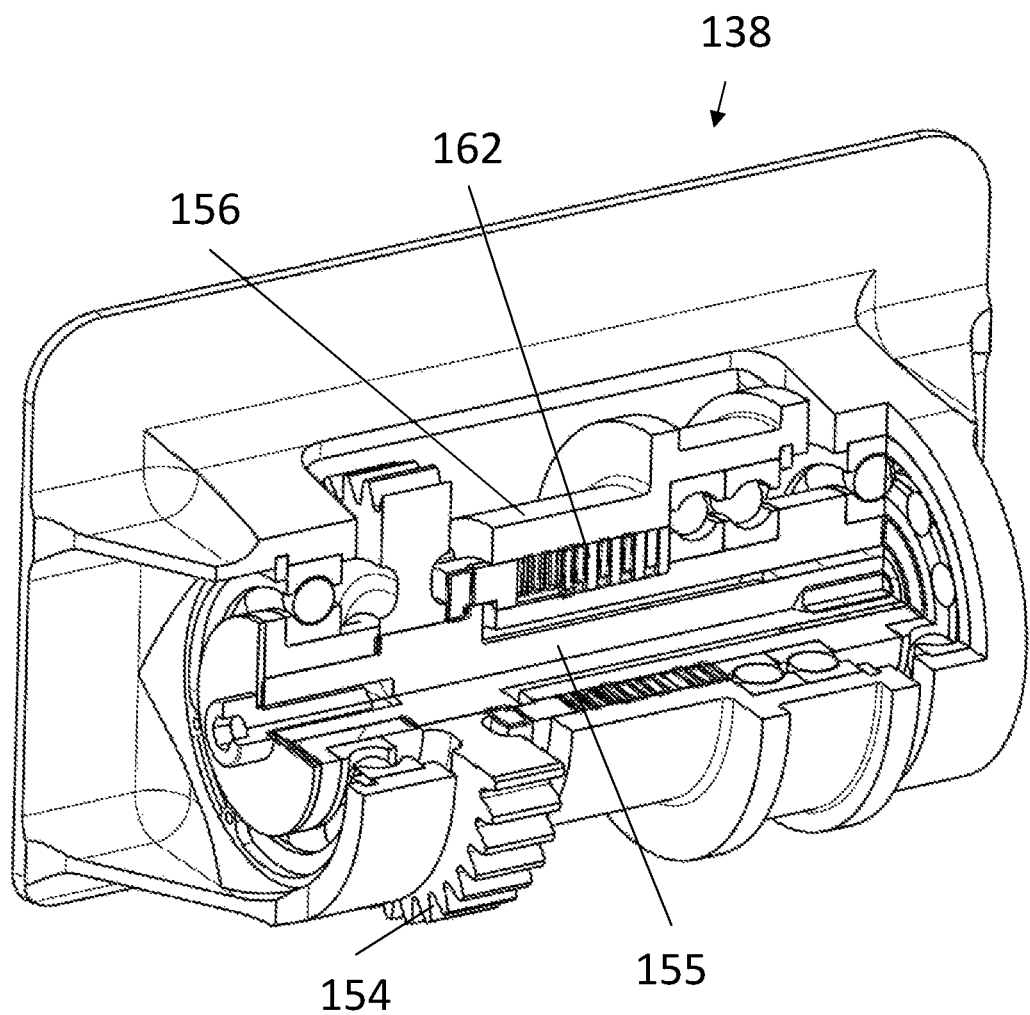
FIG. 16 shows a partial cross-sectional view of the rotary actuator of FIG. 14.

FIGS. 14 and 15 show the rotary actuator 138 which will now be described further, also with reference to FIGS. 11, 12, and 16. The rotary actuator 138 comprises a torque shaft 150 including a toothed wheel 152, which will be referred to as the torque wheel 152, and a cable drum including a toothed wheel 154, which will be referred to as the drum wheel 154. The torque shaft 150 and the torque wheel 152 are engaged such that rotation of the torque wheel 152 results in rotation of the torque shaft 150 and vice versa. The torque shaft 150 is arranged to be driven in a clockwise or anti-clockwise direction of rotation using a conventional rotary actuation mechanism, as would be understood by the skilled person. The skilled person will recognise that many conventional arrangements, including electrical, pneumatic, and/or hydraulic actuation arrangements may drive the torque shaft 150 to rotate. Where a plurality of spoilers are provided in a single aircraft wing, the respective plurality of torque wheels 152 may be driven by a common torque shaft or a common rotary actuator driving individual torque shafts, thereby ensuring simultaneous deployment and retraction of the spoilers. Alternatively, where a plurality of spoilers are provided in a single aircraft wing, each torque shaft 150 may be individually driven, for example allowing individual deployment and retraction of each of the plurality of spoilers.

The teeth of the torque wheel 152 are engaged with the teeth of the drum wheel 154, such that clockwise rotation of the torque shaft 150 and the torque wheel 152 results in anti-clockwise movement of the drum wheel 154, and vice-versa. The drum wheel 154 is engaged with a drum shaft 155 such that rotation of the drum shaft 155 results in rotation of the drum wheel 154 and vice versa. The rotary actuator 138 further comprises a cable drum 156 onto which the cable 144 is spooled, as shown in FIG. 14. The rotary actuator 138 further comprises a ramped dog clutch 158 mechanically connected to the drum wheel 154. The ramped dog clutch 158 is arranged with ramped engagement surfaces between the first part of the dog clutch and second part of the dog clutch, such that clockwise movement of the drum wheel 154 decreases the overall width of the ramped dog clutch 158, and anti-clockwise movement of the drum wheel 154 increases the overall width of the ramped dog clutch 158. The ramped dog clutch 158 is located adjacent a wave spring 160, such that the ramped dog clutch 158 is effectively sandwiched between the drum wheel 154 and the wave spring 160. Therefore, anti-clockwise movement of the drum wheel 154, which increases the overall width of the ramped dog clutch 158, compresses the wave spring 160, and clockwise movement of the drum wheel 154 decreases the overall width of the ramped dog clutch 158, reducing the compression of the wave spring 160. The wave spring 160 is sandwiched between the ramped dog clutch 158 and a series of friction clutch plates 162. The friction clutch plates 162 are alternately keyed to the drum shaft 155 running through the cable drum and the cable drum 156 itself. When the drum wheel 154 is moved anti-clockwise, compressing the wave spring 160, the friction clutch plates 162 are pushed together such that friction engages the friction clutch plates 162 and the cable drum 156 is engaged with the shaft running through the cable drum 156, this may be referred to as the engaged mode. When the drum wheel 154 is moved in a clockwise direction, the wave spring 160 decompresses, and the friction between the friction clutch plates 162 is reduced to the point that the cable drum 156 may freely rotate relative to the shaft running through the cable drum, this may be referred to as the disengaged mode.

The rotary actuator may be used to control the deployment and retraction of the spoiler 130 as follows. When the spoiler 130 is in the stowed position, the cable 144 has been wound around the cable drum 156 such that the top flap 132 is held in the first position. The torque wheel 152 is held stationary by the torque shaft 150, thereby preventing movement of the drum wheel 154. The ramped dog clutch 158 has been rotated into the widest configuration, thereby causing the wave spring 160 to press on to the friction clutch plates 162 such that free movement of the cable drum 156 relative to the drum shaft is prevented. Therefore, the spoiler 130 is held in place by the rotary actuator 138. To allow the deployment of the spoiler 130, the torque shaft 150 is rotated a small amount anti-clockwise. This results in the clockwise movement of the drum wheel 154 and the reduction in width of the ramped dog clutch. The resultant reduction in compression of the friction clutch plates 162 disengages the cable drum 156 from the drum shaft 155, such that the cable 144 may be freely unspooled from the cable drum 156. As the cable 144 is no longer holding the top flap 132 in the first position, air flow over the wing tip 120 and top flat 132 may move the top flap 132 into the second position. In the second position, the top flap 132 catches the air flow, and the spoiler 130 is pulled out of the wing tip 120 into the deployed position, thereby unspooling the cable 144 from the cable drum 156. When the spoiler 130 is to be moved from the deployed configuration back into the stowed configuration, the torque shaft 150 is rotated in a clockwise direction. This causes the drum wheel 154 to rotate in an anti-clockwise direction. The initial anti-clockwise rotation of the drum wheel 154 rotates the first part of the ramped dog clutch 158 relative to the second part of the dog clutch 158, such that the overall width of the dog clutch 158 is increased. This compresses the wave spring 160 such that the friction between the friction clutch plates 162 is increased to a point where the cable drum 156 is mechanically coupled to the drum shaft 155. Once the initial rotational movement of the drum wheel 154 has been taken up by the ramped dog clutch 158, the continued rotation of the drum wheel 154, and consequent rotation of the drum shaft 155, results in the rotation of the cable drum 156. The rotation of the cable drum 156 respools the cable 144 around the cable drum 156, which initially pulls the top flap 132 into the first position, thereby opening the air gap in the spoiler 130, and then the retraction of the spoiler 130 into the stowed position. Once in the stowed position, the rotation of the drum wheel 154 is stopped, such that the cable 144 holds the top flap 132 in the first position. The spoiler 130 may also be redeployed during the retraction process, for example when a further gust is detected that requires the spoiler 130 to be in the deployed position. In order to redeploy the spoiler 130, the rotation of the torque wheel 152 is reversed, which disengages the friction clutch plates 162, releasing the tension in the cable 142 and allowing the spoiler 130 to pop back up into the deployed position.

Whilst the present invention has been described and illustrated with reference to particular embodiments, it will be appreciated by those of ordinary skill in the art that the invention lends itself to many different variations not specifically illustrated herein. By way of example only, certain possible variations will now be described. In the embodiments described above, the spoiler includes a hinged top flap. In alternative embodiments, the spoiler may have a fixed top flap or top surface. Also described in the embodiments above, a rotary actuator is used to control the movement of the hinged top flap between the first position and second position, and also retract the spoiler from the deployed position to the stowed position. In other embodiments an alternative actuator may control movement of the hinge top flap between the first position and second position, and the same or a different alternative actuator may retract the spoiler from the deployed position to the stowed position.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features that are described as preferable, advantageous, convenient or the like are optional and do not limit the scope of the independent claims. Moreover, it is to be understood that such optional integers or features, whilst of possible benefit in some embodiments, may not be desirable, and may therefore be absent, in other embodiments.

The features of any dependent claim may be combined with the features of any of the independent claims or other dependent claims. Features described in relation to one example or embodiment may be used in other described examples or embodiments, e.g. by applying relevant portions of that disclosure.

The invention claimed is:

1. An aircraft wing comprising a wing structure and a spoiler movable relative to the wing structure between a stowed configuration and a deployed configuration, wherein the spoiler comprises an actuator configurable between an engaged mode and a disengaged mode, the actuator comprising a cable and a cable drum, the cable being attached at one end to the spoiler and at the other end to the cable drum, wherein in the engaged mode, the cable is arranged to be held under tension and the actuator is arranged to restrict movement of the spoiler and/or move the spoiler between the stowed configuration and deployed configuration, and in the disengaged mode, the tension in the cable is released and the actuator allows free movement of the spoiler such that the spoiler can be moved from the stowed configuration to the deployed configuration unencumbered, and when the spoiler is retracted to the stowed configuration, the cable is tensioned in the engaged mode and arranged to be reeled around the cable drum.

2. An aircraft wing as claimed in claim 1, wherein the actuator is arranged to move the spoiler from the deployed configuration to the stowed configuration.

3. An aircraft wing as claimed in claim 1, wherein the actuator comprises a clutch arrangement which, when the actuator is in the disengaged mode, allows free movement in one direction when the spoiler is being moved into the deployed configuration.

4. An aircraft wing as claimed in claim 3, wherein when the actuator is in the engaged mode, the clutch arrangement is configured to engage a drive mechanism to allow the spoiler to be retracted into the stowed configuration.

5. An aircraft wing as claimed in claim 3, wherein when the actuator is in the engaged mode, the clutch mechanism is arranged to be lockable to prevent movement of spoiler.

6. An aircraft wing as claimed in claim 3, wherein the clutch mechanism may comprise a dog clutch.

7. An aircraft wing as claimed in claim 6, wherein the dog clutch comprises a ramped dog clutch.

8. An aircraft wing as claimed in claim 3, wherein the clutch mechanism comprises a spring.

9. An aircraft wing as claimed in claim 3, wherein the clutch mechanism comprises series of friction clutch plates.

10. An aircraft wing as claimed in claim 3, wherein the clutch mechanism comprises each of a ramped dog clutch, a spring, and a series of friction clutch plates.

11. A method of deploying a stowed spoiler in an aircraft wing according to claim 1, the method comprising the step of configuring the actuator in the disengaged mode, thereby allowing for free movement of the spoiler.

12. A method of retracting a deployed spoiler in an aircraft wing according to claim 1, the method comprising the step of configuring the actuator in the engaged mode, and activating the actuator to retract the spoiler.

* * * * *